K. A. SIMMON & A. J. HALL.
CONTROLLER.
APPLICATION FILED APR. 4, 1914.

1,267,919.

Patented May 28, 1918.

WITNESSES:

INVENTORS
Karl A. Simmon
Arthur J. Hall
BY
ATTORNEY

UNITED STATES PATENT OFFICE.

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROLLER.

1,267,919.

Specification of Letters Patent.　　Patented May 28, 1918.

Application filed April 4, 1914.　Serial No. 829,421.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Controllers, of which the following is a specification.

Our invention relates to controllers for governing the operation of dynamo-electric machines, and it has for its object to provide a device of the above-indicated character which shall be simple, inexpensive and compact in construction, and which shall embody means for interlocking a plurality of operating drums with a single drum, whereby the plurality of drums are prevented from movement until the single drum occupies a predetermined position and whereby the single drum is restrained against further movement until the remaining drums occupy their initial positions.

Figure 1:
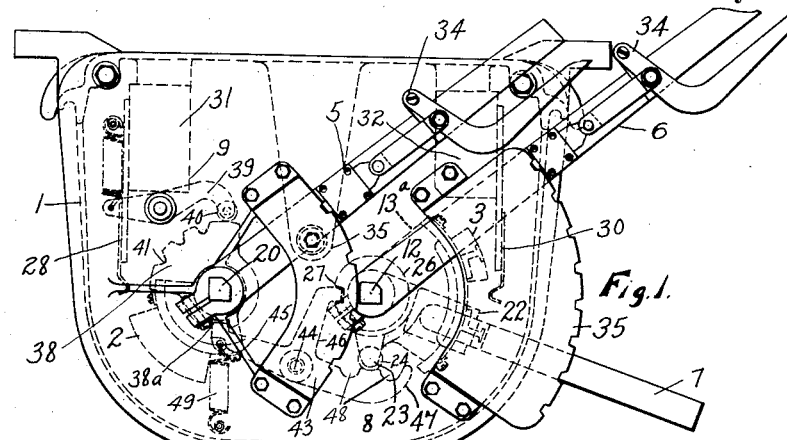
Figure 2:
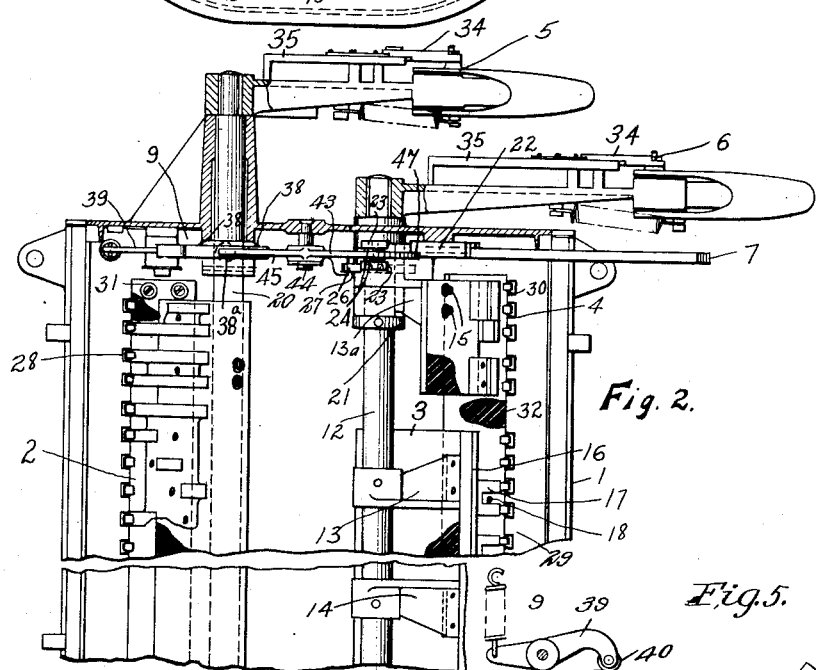
Figures 3, 4, 5:
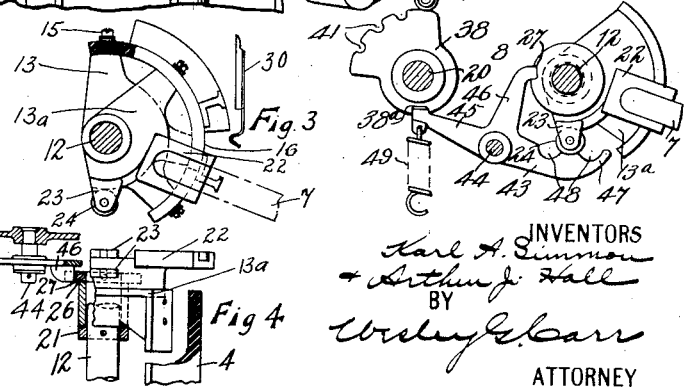

In the accompanying drawing, Figure 1 is a plan view of a controller constructed in accordance with our invention, Fig. 2 is a view, partially in section and partially in side elevation, of a portion of the apparatus shown in Fig. 1; Figs. 3 and 4 are, respectively, a plan view, and a view partially in section and partially in side elevation, of a portion of our controller, and Fig. 5 is a view, partially in plan and partially in section, of a portion of the interlocking mechanism of our controller.

Referring to the drawing, the apparatus shown comprises a casing 1, a plurality of operating drums 2 and 3, a reverser drum 4, a plurality of handles 5, 6 and 7, an interlocking mechanism 8 and an accentuating device 9.

The operating drum 3 is mounted upon a rotatable shaft 12, with which the handle 6 is associated, and embodies a plurality of supporting arms 13 and 14 which are suitably fixed to the shaft 12. Each of the arms 13 and 14 is substantially sectorial in form, and, secured to the ends thereof by means of screws 15, is an annular or cylindrical shell member 16, preferably of insulating material. A plurality of contact segments 17 are disposed upon the perimeter of the annular member 16 and are detachably fastened thereto, preferably by screws 18 or other suitable means.

The operating drum 2 is of like construction and is rigidly mounted upon a shaft 20 to which the handle 5 is attached.

The reverser drum 4 differs from drums 2 and 3 only in that it is supported by a single arm 13ª, and said arm is loosely mounted upon the shaft 12 and rests upon a collar 21 which is pinned to said shaft. Moreover, the arm 13ª embodies an integral upwardly projecting portion 22 which is adapted to receive the reverser handle 7, and also embodies a plurality of lugs 23 between which a roller 24 is pivotally mounted. A second collar 26 is rigidly secured to the shaft 12 above the arm 13ª, and said collar has a circumferential recess 27, for a purpose to be hereinafter set forth. The several drums 2, 3 and 4 are adapted to coöperate respectively with a plurality of sets of contact fingers 28, 29 and 30, which are suitably mounted upon supporting blocks 31 and 32, preferably of insulating material.

The handles 5 and 6 are of like construction, and each is secured to its respective shaft and embodies a suitable locking mechanism 34 which coöperates with a notched plate 35 for definitely locking the handle in its various operating positions. Since the specific construction of the handles and the locking mechanism pertains only indirectly to our present invention, no description thereof will be given.

The accentuating device 9 comprises a notched segment 38 which is pinned to the shaft 20 and is provided with an opening 38ª in the periphery of its hub portion, for a purpose to be set forth. Coöperating with the notched segment 38, is a spring-actuated pawl 39, having a roller 40 for engaging the several notches 41 of the member 38, whereby the position of the operating drum 2 is accentuated.

The interlocked mechanism 8 comprises a pawl 43 which is pivotally mounted upon a stud 44 and embodies a plurality of arms 45, 46 and 47. The arm 47 is adapted to coöperatively engage the roller 24 and is provided with a plurality of notches 48 for receiving the roller 24, when the reverser drum 4 occupies either of its operative positions. The ends of the arms 45 and 46 are respectively disposed in the notches 38ª and 27 of the notched segment 38 and the collar 26, when all of the drums 2, 3 and 4 occupy their "off" or initial positions. A spring 49 is provided for actuating the pawl 43, when released.

Assuming the various parts to occupy the positions shown, both the operating drums 2 and 3 are locked into position and cannot be moved until the reverser drum 4 is moved to one of its operating positions. Assuming that the actuation of the reverser drum 4 has been effected, the roller 24 moves into the one or the other of the notches 48 of the pawl, 43, thereby permitting the spring 49 to withdraw the arms 45 and 46 of the pawl 43 from the notches 38ª and 27. Thus, the operating drums 2 and 3 are released, and either or both drums may be moved to any position by suitable manipulation of their respective handles 5 and 6.

The ends of the arms 45 and 46 then respectively engage the peripheries of the notched segment 38 and the collar 26, whereby further movement of the reverser drum 4 is prevented until both of the operating drums 2 and 3 are returned to their initial positions, after which, the reverser drum may be actuated to its "off" or to its other operating position.

We do not wish to be restricted to the specific structural details and arrangement and location of parts set forth, and desire that only such limitations shall be imposed as are indicated in the appended claims.

We claim as our invention:

1. In a controller, the combination with a plurality of co-axially disposed control drums, another control drum in side-by-side relation thereto, and a plurality of operating handles respectively associated with said control drums, of means embodying a single locking member operatively associated with said drums for mutually interlocking all of said drums.

2. In a controller, the combination with a plurality of co-axially disposed control drums, another control drum in side-by-side relation thereto, and a plurality of operating handles respectively associated with said control drums, of a single pivotally mounted locking member having a plurality of integral arms operatively associated with the respective control drums for interlocking said drums against improper movements.

3. In a controller, the combination with a plurality of co-axially disposed rotatable drums, and an auxiliary drum in side-by-side relation thereto, of a single locking member operatively associated with said drums for interlocking all of the same.

4. In a controller, the combination with a plurality of rotatable drums, and an auxiliary drum in side-by-side relation thereto, of a single pivotally-mounted member operatively associated with said drums for mutually interlocking all of the same.

5. In a controller, the combination with a plurality of rotatable control drums, and an auxiliary drum in side by side relation thereto, of a single pivotally-mounted locking member having arms operatively associated with said drums for mutually interlocking all of said drums against improper movements.

In testimony whereof, we have hereunto subscribed our names this 27th day of Mar., 1914.

KARL A. SIMMON.
ARTHUR J. HALL.

Witnesses:
G. R. GWIN,
B. B. HINES.